(12) United States Patent
Ekner

(10) Patent No.: US 6,289,445 B2
(45) Date of Patent: *Sep. 11, 2001

(54) CIRCUIT AND METHOD FOR INITIATING EXCEPTION ROUTINES USING IMPLICIT EXCEPTION CHECKING

(75) Inventor: Hartvig Ekner, Holte (DK)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/119,829

(22) Filed: Jul. 21, 1998

(51) Int. Cl.$^7$ .................................................. G06F 9/00
(52) U.S. Cl. ............................................ 712/244; 712/235
(58) Field of Search .................... 711/141; 710/260; 717/9; 712/244, 228, 216, 234, 205, 235; 714/15

(56) References Cited

U.S. PATENT DOCUMENTS

| 5,237,700 | 8/1993 | Johnson et al. . |
| 5,446,862 | 8/1995 | Ohkami . |
| 5,526,499 | 6/1996 | Bernstein et al. . |
| 5,537,559 | 7/1996 | Kane et al. . |
| 5,812,868 | 9/1998 | Moyer et al. . |
| 5,832,293 | 11/1998 | Popescu et al. . |
| 5,835,748 | 11/1998 | Orenstein et al. . |
| 5,867,724 | 2/1999 | McMahon . |
| 5,881,280 | 3/1999 | Gupta et al. . |
| 5,926,832 | * 7/1999 | Wing et al. ........................... 711/141 |
| 5,987,258 | * 11/1999 | Daniel et al. ............................ 717/9 |
| 6,038,631 | * 3/2000 | Suzuki et al. ........................ 710/260 |
| 6,038,661 | * 3/2000 | Yoshioka et al. ..................... 712/244 |
| 6,044,460 | * 3/2000 | Eckner et al. ........................ 712/244 |

OTHER PUBLICATIONS

Halfhill, "Beyond Pentium II," BYTE Magazine, Dec. 1997.
Crawford et al., Motivations and Design Approach for a New 64–Bit Instruction Set Architecture, Microprocessor Forum presented by MicroDesign Resources, Oct. 1997.

* cited by examiner

*Primary Examiner*—Meng-Al T. An
*Assistant Examiner*—Jungwon Chang

(57) ABSTRACT

A circuit and method is provided which allows a microprocessor to implement speculative load instructions with implicit exception checking. In one embodiment of the method, exception information is generated in response to a memory access exception caused by a speculative load instruction for loading one of a plurality of first registers with data from memory. The exception information, once generated, is stored within one of a plurality of second registers. Each of the second registers corresponds to at least one of the plurality of first registers and is configured to store exception information. Thereafter, an instruction for operating on data stored in a first register is received and decoded by the microprocessor. In response, a second register corresponding to the first register is accessed. If this second register contains exception information, then the microprocessor initiates the exception routine. On the other hand, if the second register does not contain exception information, then the instruction for operating on data contained in the first register is executed.

21 Claims, 6 Drawing Sheets

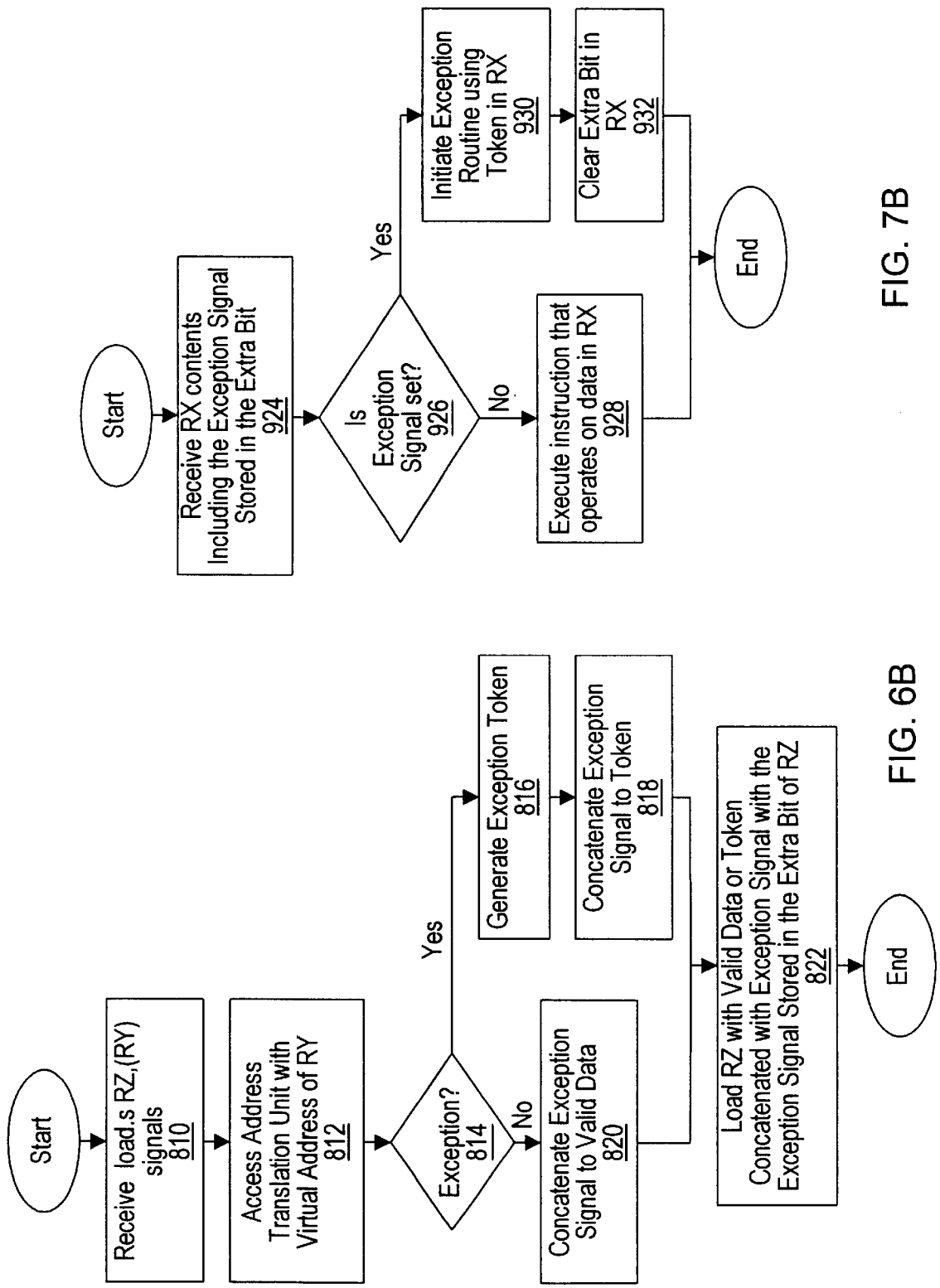

CIRCUIT AND METHOD FOR INITIATING EXCEPTION ROUTINES USING IMPLICIT EXCEPTION CHECKING

BACKGROUND OF THE INVENTION

1. Field of the Invention

The present invention relates to the field of microprocessors and, more particularly, a method and circuit for executing speculative load instructions with implicit exception checking.

2. Description of the Relevant Art

Instruction scheduling is a well-known process of rearranging instructions of an application program before execution by a microprocessor in order to increase instruction execution and thus application program execution efficiency. Instruction scheduling is typically implemented at an intermediate language level. Scheduling must preserve data dependencies between instructions in addition to fulfilling other considerations.

Instruction scheduling finds advantage when performed in connection with pipelined microprocessors. Pipelined microprocessors allow increased throughput by overlapping instruction execution. As an example of the efficiency connected with pipelined microprocessors, if there is a one-clock cycle delay between requesting data and data being available for the execution of an instruction, it would be desirable to insert one instruction into the one-clock cycle delay where the inserted instruction is independent of the data fetched and is ready to be executed.

Instruction scheduling can be employed in reduced instruction set computers (RISC). RISC-based systems provide a basis for high speed execution of instructions. These systems typically require streamlining application instructions in order to achieve high speed operations. RISC-based systems typically employ instruction scheduling to take full advantage of pipelining and thereby to improve performance. Instruction scheduling is performed by compilers which generate code for the RISC processors. The compilers typically schedule instructions at the basic block level.

Microprocessors with multi execution units (i.e, superscalar microprocessors) can execute several instructions each clock cycle. Pipelined microprocessors seek to issue a new instruction each cycle. However, compilers for each type of microprocessor seek to identify instructions that are data independent to allow scheduling of instructions that better utilize the microprocessor resources which, in turn, increases instruction throughput.

Data independent instructions can be found within basic blocks. However, it was a common view that there was no need to move instructions beyond basic block boundaries. A basic block is a sequence of consecutive instructions for which the flow of control enters at the beginning of the sequence and exits at the end without a possible branch, except at the point of exit. Virtually all prior art implementations of instruction scheduling focused on scheduling instructions within basic blocks.

As noted above, new architectures employ superscalar implementations which allow more than one instruction to issue per clock cycle. Superscalar microprocessors present more serious challenges to compilers, since instruction scheduling at the basic block level fails to generate code that utilizes microprocessor resources to the desired extent.

Scheduling instructions beyond the scope of basic blocks has been investigated resulting in considerable improvements of instruction throughput. However, the effect of moving instructions beyond block boundaries is limited unless the instructions can be scheduled speculatively. Speculative scheduling means that instructions are executed ahead of time before a preceding conditional branch is performed. As a result, the results of some speculatively scheduled instructions are not used in the subsequent execution of the program.

An important speculative instruction is the speculative load instruction. Computational sequences generally start with an instruction which loads operands from memory into registers. However, if load instructions are scheduled speculatively, an undesired exception may arise in program execution due to an access to a nonexistent or protected memory location.

Traditionally, load instructions must be performed within the basic block in order to avoid generating access exceptions. The following sequence of instructions is an example of a basic block with a load instruction contained therein:

LISTING 1:

| INSTRUCTION | OPERATION |
|---|---|
| move RY, <pointer> | Move pointer (memory address) into register RY |
| beq RY, zero, NULLP | Branch to NULLP if pointer equals zero |
| Load RZ, (RY) | Load data into register RZ from memory at pointer |
| <perform operation on RZ data> | Perform some operation on data in RZ |
| Store RZ, (RY) | Store results of operation |

In this example sequence, the prior art would not schedule the load instruction load RZ,(RY) prior to the branch beq RY,zero,NULLP because in the case of a null pointer, an exception is generated that otherwise would not have occurred.

One prior art method for scheduling a load instruction beyond the boundaries of a basic block (thereby creating a speculative load) involves coupling the speculative load with an exception checking instruction. In this prior art method, the speculative load is moved outside the basic block and will not generate an exception. Rather, this prior art method saves a potential exception condition within some registers. Once inside the basic block where the load instruction originally was positioned prior to scheduling, a special instruction is provided and used to check for the potential exception. Shown below is an example of a sequence in which a load instruction is scheduled outside a basic block and an exception checking instruction is inserted therefor:

LISTING 2:

| INSTRUCTION | OPERATION |
|---|---|
| move RY, <pointer> | Move pointer (memory address) into register RY |
| load.s RZ, (RY) | Speculatively load data into RZ from memory at pointer |
| beq RY, zero, NULLP | Branch to NULLP if pointer equals zero |
| Check.s RZ, (RY) | Check for potential exception caused by speculative load.s |
| <perform operation on RZ data> | Perform some operation on data in RZ |
| Store RZ, (RY) | Store results of operation |

Here the load instruction has been scheduled outside the basic block, i.e., prior to the branch instruction. The checks instruction initiates an exception routine if the loads has created one. However, in most cases, the check.s instruction will be executed quickly (more quickly than, for example, a load instruction with/without cache miss) because the load instruction has completed and there were no exceptions.

Clearly, microprocessors which avoid scheduling speculative loads suffer from the disadvantage that the load instructions must stay within the basic blocks to which they belong. Since load instructions can take several cycles to execute, such as in the case of a cache miss, it is clearly desirable to have load instructions scheduled as early as possible in the code.

In microprocessor architectures which support load.s/check.s instruction pairs described above, the load instructions can be scheduled outside the basic block, thereby increasing performance. However, since each original load instruction is replaced with a load plus a check.s instruction, compiled code size will increase which, in turn, reduces microprocessor speed. Speed may also be degraded due to the "potential" cycle use by the check.s instruction.

SUMMARY OF THE INVENTION

The problems outlined above are in large part solved by a circuit and method for storing exception information in a register for later use if required. In one embodiment of the method, exception information is generated in response to a memory access exception caused by a speculative load instruction for loading one of a plurality of first registers with data from memory. The exception information, once generated, is stored within one of a plurality of second registers, wherein each of the second registers corresponds to at least one of the plurality of first registers and is configured to store exception information. Thereafter, an instruction for operating on data stored in a first register is received and decoded. In response to receiving and decoding this instruction, the contents of a second register corresponding to the first register is implicitly checked. If this second register contains exception information, then the microprocessor initiates the exception routine. On the other hand, if the second register does not contain exception information, then the instruction for operating on data contained in the first register is executed.

One advantage of the present invention is that it reduces the number of instructions needed for executing a program application by eliminating specific check.s instructions.

Still another advantage of the present invention is that it will increase microprocessor speed of operation.

BRIEF DESCRIPTION OF THE DRAWINGS

Other objects and advantages of the invention will become apparent upon reading the following detailed description and upon reference to the accompanying drawings in which:

FIG. 6B is a flow chart illustrating operational aspects of the memory access unit and write-back unit in accordance with another embodiment of the present invention;

FIG. 7B is a flow chart illustrating aspects of the execution unit operating in accordance with another embodiment of the present invention.

Figure 1:
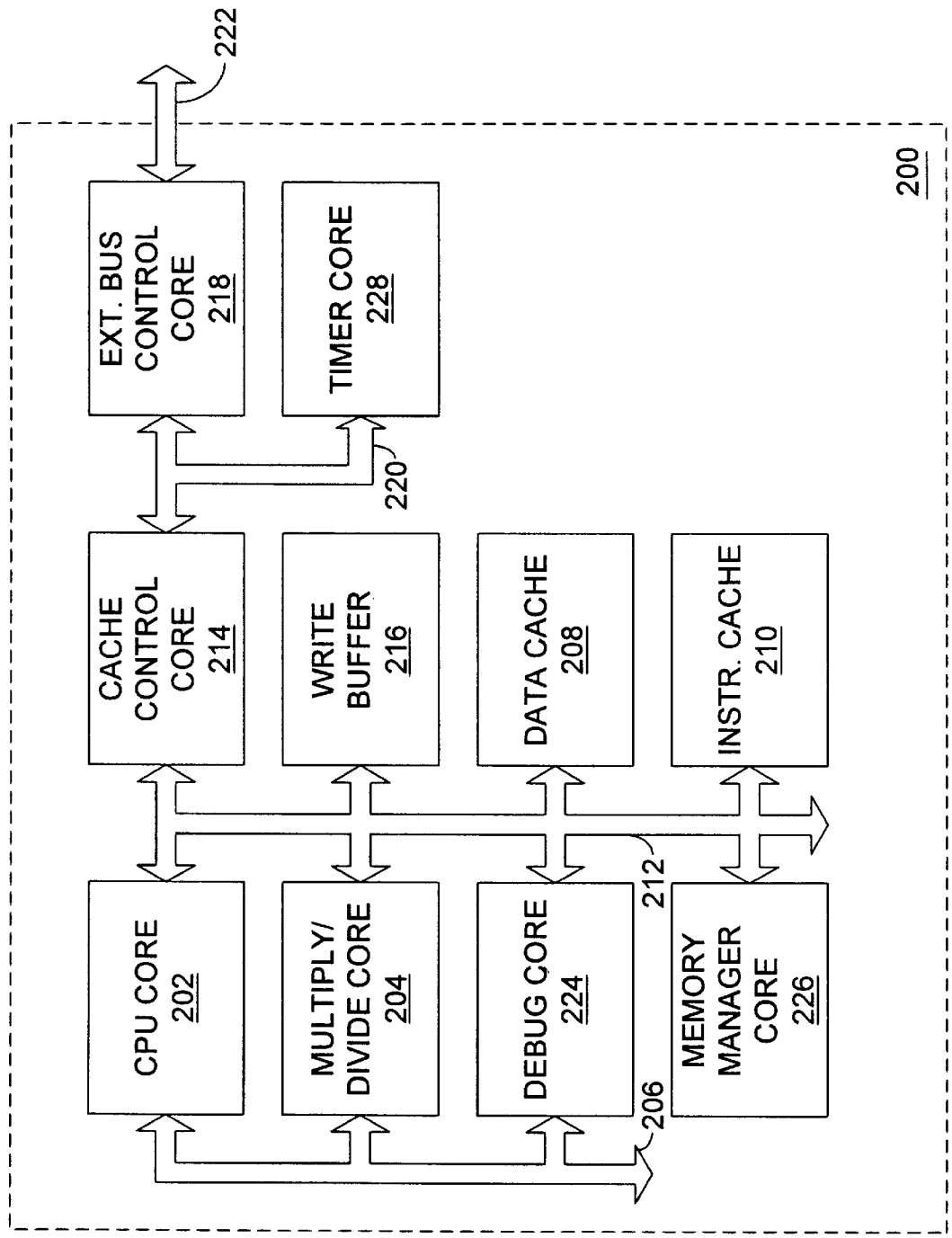
FIG. 1 is functional block diagram of an exemplary integrated circuit which includes a processor core.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, the present invention will be described with reference to custom designed integrated circuits. However, it is to be understood that the present invention should not be limited thereto. Rather, the present application has broad application including use within general purpose microprocessors including superscalar microprocessors which implement the x86 instruction set or equivalents thereto.

Custom designed integrated circuits often involve a prohibitive amount of design effort which is desirable to minimize. One popular method for reducing design costs is to use a set of predesigned core modules, or (cores) which implement standard functions which may be mixed and matched by customers to obtain a custom designed integrated circuit with desired functionality. A block diagram of an exemplary custom designed circuit is shown in FIG. 1. By choosing cores from a set of predefined core modules, a system designer is able to quickly create an ASIC for nearly any desired purpose.

With reference to FIG. 1, should a designer wish to create, for example, a programmable multi-axis servo-controller ASIC 200 (for example), the designer could take a high-speed RISC core 202 and augment it with a multiply/divide core 204 using an extension of an internal CPU bus 206. A data cache 208 and an instruction cache 210 may be coupled to CPU core 202 via a local CPU bus 212 to provide support for the high speed RISC core. A cache controller 214 would then also be coupled to local CPU bus 212 and perhaps be supported with a write buffer 216. An external bus control core 218 could be used to couple an on-chip system bus 220 with an off-chip system bus 222 for access to external memory chips, sensors, and control line drivers. Additional cores may be incorporated to provide other features. A debug core 224 designed to assist in system debugging may be built into the ASIC 200. Memory management features may be provided with a memory manager core 226, and space permitting, an on-chip timer core 228 may be provided. While this is but one example of the use of processor cores, it illustrates the utility and environment for which processor integrated circuits are being designed.

Microprocessors, microcontrollers, digital signal processors, and processor cores in general, often experience exception events other than branches that change the normal flow of instruction execution. Exceptions are created by a variety of circumstances including memory access problems such as memory protection violations or page faults. Page faults are well known in the art and result from a data fetch, which cannot occur. In response to a page fault, for example, an exception routine is initiated within the processor core. The exception routine reads in the required page containing the requested data from secondary memory, updates its new physical memory location within a page table, and then repeats the instruction that caused the page fault. It is to be noted, however, that exception routines are not limited to routines that resolve page faults.

Hardware and/or exception routines must be designed so that the full state of the processor core can be saved at the time of exception, including, for example, an indication of the fetch or load instruction which caused the page fault, and the address of the instruction to be executed after the page fault or exception is serviced.

Figure 2:
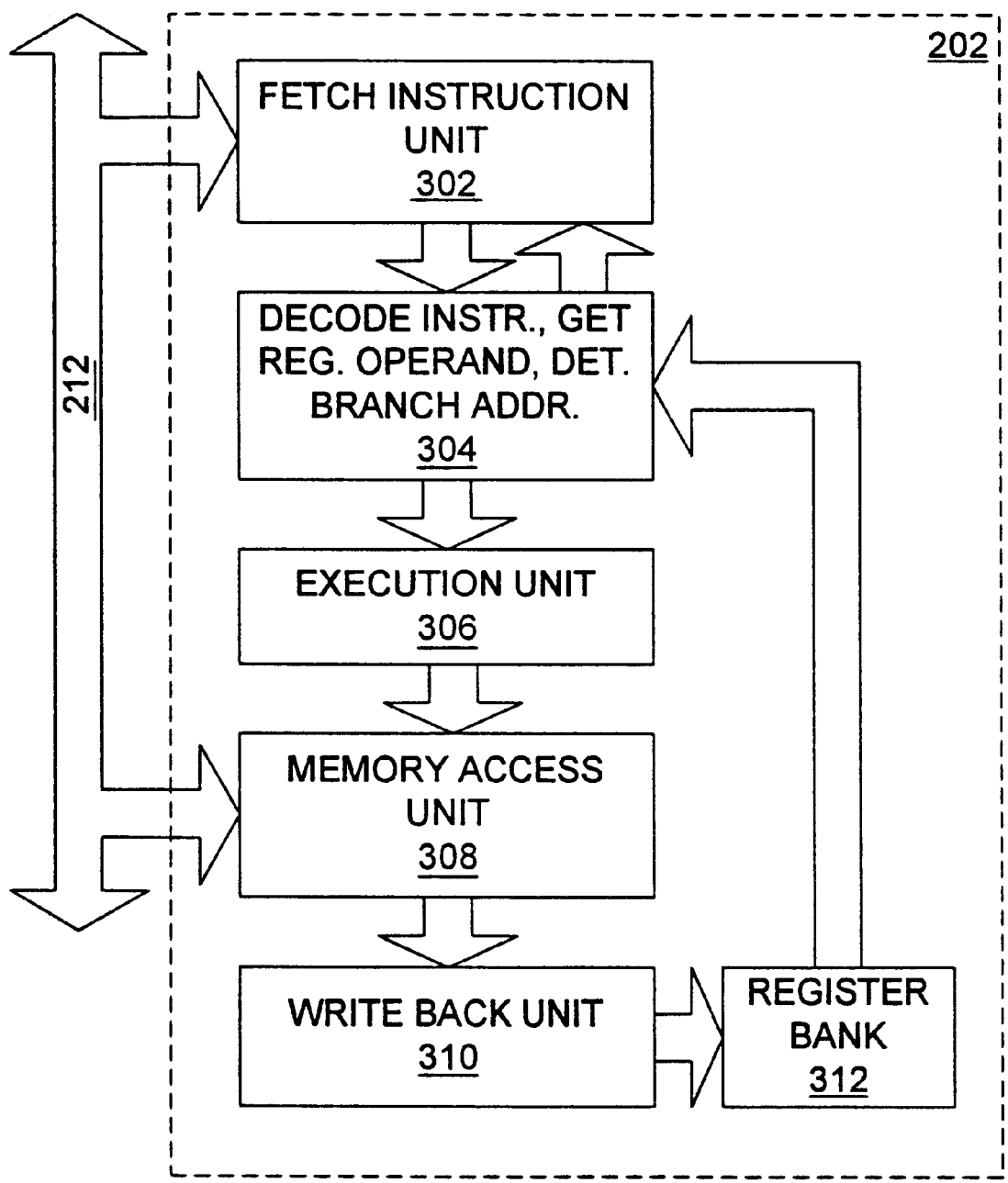
FIG. 2 is a functional block diagram of a pipelined processor core.

Turning now to FIG. 2, one embodiment of the pipelined processor core 202 of FIG. 1 is shown. Processor core 202 of FIG. 2 operates in accordance with the present invention. Processor core 202 includes a fetch unit 302, a decode unit 304, an execution unit 306, a memory access unit 308, a write-back unit 310, and a register bank 312. The fetch unit 302, the decode unit 304, the execute unit 306, the memory access unit 308, and the write-back unit 310 cooperate together to form an execution pipeline. Pipelining is an implementation whereby multiple instructions are simultaneously overlapped in execution. It provides a method for improving the efficiency and execution speed of the CPU. In a pipeline structure, instructions enter at one end, are processed through the units or pipe segments, and exit at the other end. Each of the units of the pipeline completes a part of the instruction.

Fetch unit 302 includes a program counter which indicates the memory address of the next instruction to be fetched. The fetch unit 302 receives the indicated instruction during a first pipeline cycle by accessing the local CPU bus 212. At the beginning of the next pipeline cycle, the instruction is provided to decode unit 304.

Decode unit 304 receives the fetched instruction, identifies operands of the native instruction and produces control information which indicates how to carry out an operation specified by the fetched instruction. Operands which may be identified by decode unit 304 include literal values provided within the fetched instruction and register operands. Identified register operand values are retrieved from register bank 312, and the fetched instruction is converted into control signal form for use by execution unit 306. Decode unit 304 provides the control information along with the identified operands to execution unit 306. During the second pipeline cycle, decode unit 304 also determines if the fetched instruction represents a jump or a potential branch, and if so, it calculates the address of the target instruction using immediate operands of the instruction and register values, and provides the target address to the fetch instruction module 302. Decode unit 304 may detect register dependencies on results of instructions which have not yet exited a pipeline and be accordingly configured to stall fetch unit 302 until the needed register values are provided.

During the subsequent pipelined cycle, execution unit 306 carries out arithmetic and/or logical operations necessary to implement the desired operation. The results produced by execution unit 306 are provided to memory access unit 308 at the beginning of the next pipeline cycle. If the native operation does not indicate a memory access, memory access unit 308 merely acts as a temporary holding register. Otherwise, memory access unit 308 provides data to or retrieves data from local CPU bus 212. In the following pipeline cycle, write-back unit 310 takes the output from memory access unit 308 and uses it to update register bank 312.

Processor core 202 is configured to fetch, decode, execute, access memory and write back results for the following exemplary sequence of instructions:

TABLE 1

| INSTRUCTION | OPERATION |
| --- | --- |
| move RY, <pointer> | Move pointer (memory address) into register RY. |
| load.s RZ, (RY) | Speculatively load data into register RZ from memory at pointer. |
| beq RY, zero, NULLP | Branch to NULLP if pointer equals zero. |
| <perform operation on RZ data> | Check for potential exception caused by load.s. If no exception, perform operation on data. Otherwise, initiate exception routine. |
| Store RZ, (RY) | Store results of operation. |

In the above instruction sequence load.s is a speculative load instruction since it has been compiled outside the basic block defined by the branch instruction beq. The load.s instruction may cause an exception. If an exception is generated, the appropriate exception routine is not immediately initiated. It is noted that unlike the prior art, there is no check.s instruction within the basic block for checking for an exception. Rather, the instruction for operating on the data in RZ implicitly checks the results of the load.s instruction for an exception and proceeds accordingly.

Figure 3B:
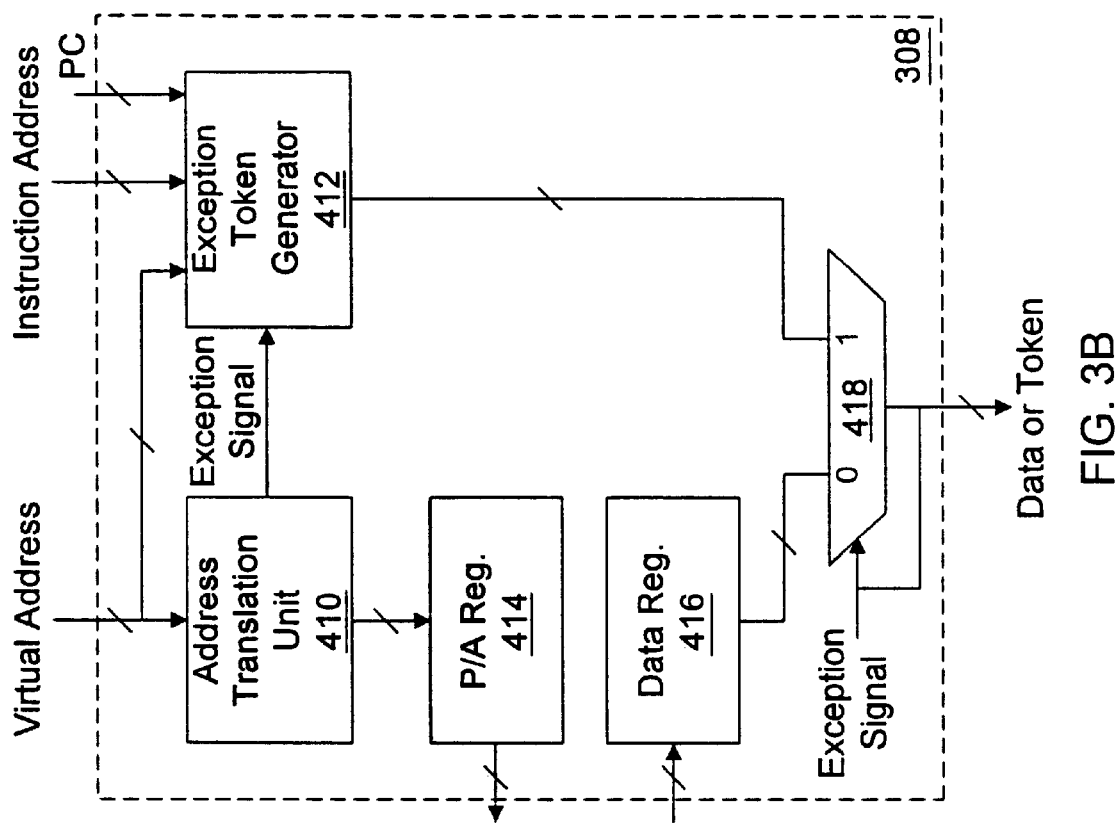
FIG. 3B is a functional block diagram of another embodiment of the memory access unit of the pipelined processor core shown in FIG. 2.
Figure 3A:
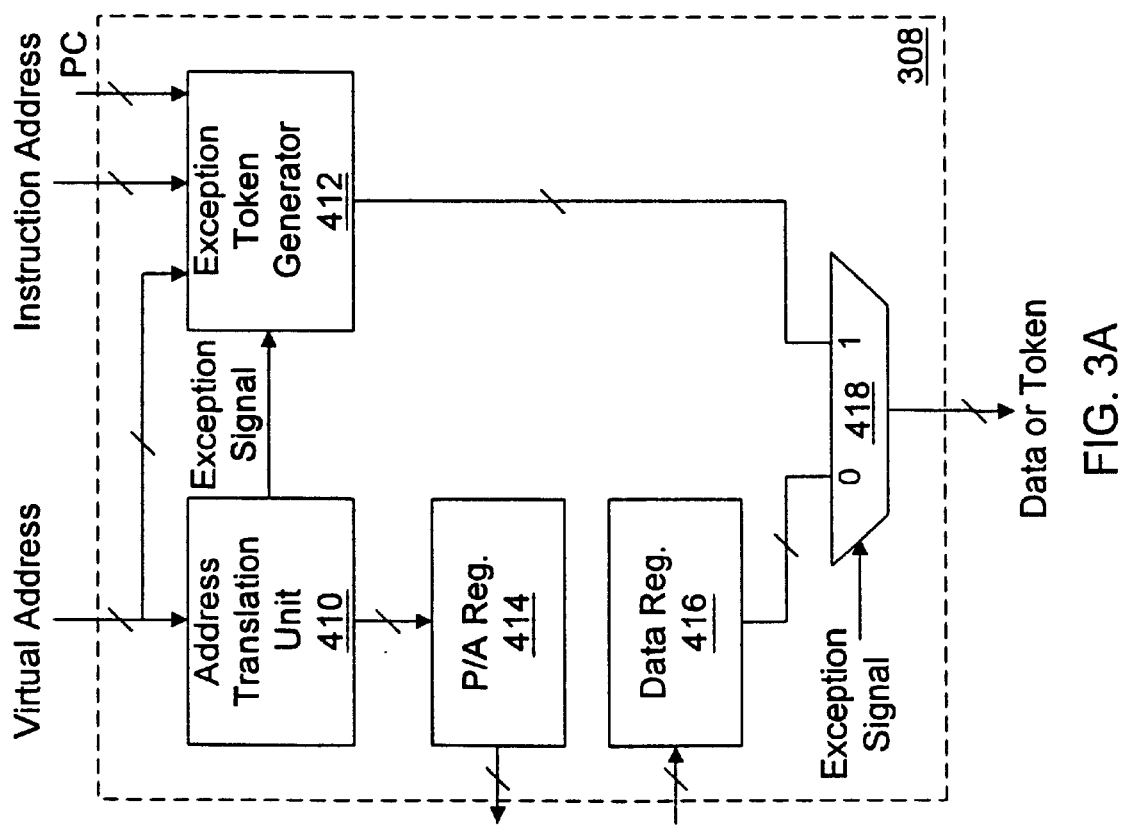
FIG. 3A is a functional block diagram of one embodiment of the memory access unit used within the pipelined processor core shown in FIG. 2.

Turning now to FIG. 3A, one embodiment of the memory access unit 308 of FIG. 2 is shown. Memory access unit 308 includes an address translation unit 410 which further includes a translation look aside buffer (not shown), exception token generator 412, physical address register 414, data register 416, and multiplexer 418. In general operation, memory access unit 308 receives a virtual data address corresponding to a load.s instruction from execution unit 306 (not shown in FIG. 3A). In response, memory access unit 308 translates the virtual data address into a physical data address which in turn is stored within physical address register 414. The physical data address within register 414 is provided to the memory system which includes data cache 208 of FIG. 1. If no exception is generated, the data corresponding to the physical address is transmitted back to memory access unit 308 and stored into data register 416. Once returned, the data is routed through multiplexer 418 to a register within register bank 312 (see FIG. 2). If the received virtual address from execution unit 306 creates an exception due to, for example, a page fault or a memory protection violation, address translation unit 410 will generate an exception signal which is provided to exception token generator 412. In response, exception token generator generates an exception token containing information necessary to initiate the appropriate exception routine. This information may include the address of the load.s instruction causing the exception, the current program counter, the type of exception, or the virtual address of the data sought from the memory system. The exception token, once generated, is routed through multiplexer 418 to a register, again, contained within register bank 312. Thus, multiplexer 418 routes either data contained within register 416 or the generated exception token, depending on whether an exception is detected by address translation unit 410. In one embodiment, the exception signal controls multiplexer 418. If the address translation unit detects an exception, the exception signal is set to logical one which in turn causes multiplexer 418 to route the generated exception token to the register bank 312. If no exception is detected by address translation unit 410, address translation unit generates an exception signal set to logical 0 which in turn causes multiplexer 418 to route data from register 416 to the register bank 312.

Figure 4B:
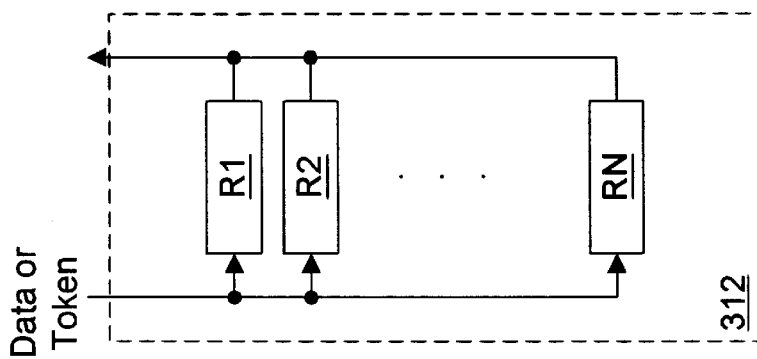
FIG. 4B is a functional block diagram of an alternative embodiment of the register bank of the pipelined processor core shown in FIG. 2.
Figure 4A:
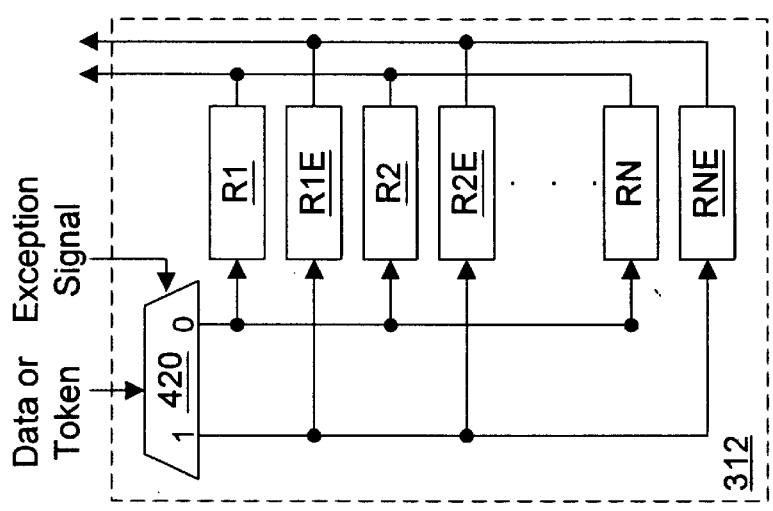
FIG. 4A is a functional block diagram of one embodiment of the register bank shown within the pipelined processor core of FIG. 2.

FIG. 4A is a block diagram of one embodiment of register bank 312 shown in FIG. 2. Register bank 312 includes a plurality of architectured registers R1–RN, a plurality of exception registers R1E–RNE, and a demultiplexer 420. Register bank 312 is coupled to multiplexer 418 of the memory access unit 308 of FIG. 3A via write back unit 310 of FIG. 2. Information received from the memory access unit 308 of FIG. 3A is stored in an architectured register RX or an exception register RXE of an RX/RXE pair depending upon whether the information received from write back unit 310 is valid data or exception token, respectively. In other words, valid data is stored in an architectured register RX of a pair of registers RX/RXE while an exception token is stored in an exception register RXE of the pair of registers RX/RXE. Demultiplexer 420 is coupled to receive the exception signal generated by address translation unit 410 shown in FIG. 3A. Thus, the demultiplexer 420 operates as a function of whether address translation unit 410 detects a memory access exception. If address translation unit 410 detects a memory access exception, address translation unit 410 generates a logical one signal which in turn causes demultiplexer 420 to route the received exception token into one of the exception registers RXE. If there is no memory access exception detected by address translation unit 410, a logical zero is generated as the exception signal which in turn causes demultiplexer 420 to route valid data into one of the architectured registers RX. It is noted that there are equal numbers of architectured registers RX and exception registers RXE. Each architectured register is physically paired with a corresponding exception register. The present invention should not be limited thereto. Rather, there can be an unequal number of exception registers RXE including a lesser number of exception registers RXE. In such a system, a mechanism must be provided which keeps track of how the exception registers are paired with the architectured registers. Information, i.e., data or exception token, is routed to a particular RX/RXE pair within register bank 312 shown in FIG. 4A by write back unit 310 which operates, for example, in accordance with the identification of an architectured register RX in a corresponding load instruction. Although circuitry is not shown, a mechanism may be provided for enabling a particular RX/RXE pair to receive information from demultiplexer 420 in accordance with the corresponding load.s instruction. However, as noted above, one of the registers in the particular RX/RXE pair is selected to receive information via demultiplexer 420. Further, it is noted that when decode unit 304 of FIG. 2 receives, for example, an instruction for performing a calculation on an architectured register RX, the register file shown in FIG. 4A forwards the contents of the architectured register RX in addition to the contents of the corresponding exception register RXE to execution unit 306 as will be more fully described below.

Figure 5B:
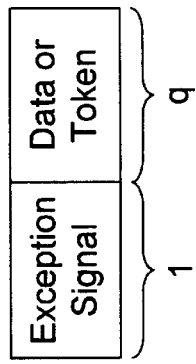
FIG. 5B illustrates the format of data or exception tokens stored within one of the registers of FIG. 4B.
Figure 5A:
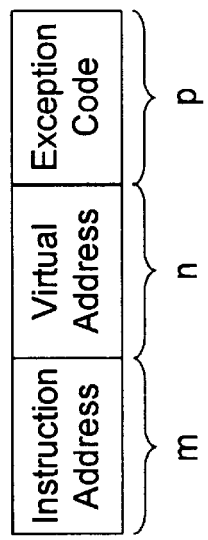
FIG. 5A illustrates the format of exception tokens stored within one of the exception registers shown within FIG. 4A.

FIG. 5A shows one embodiment of the format for the exception token stored within one of the exception registers RXE of FIG. 4A. As noted above, the exception token may include (1) the address of the load.s instruction causing the exception which in turn is stored within the first m most significant bits, (2) the virtual address causing the exception which in turn is stored within the next n most significant bits, or (3) an exception code defining the type of exception, e.g., page fault or memory protection violation, which is stored in the last p most significant bits of the exception register. As noted above, the exception token stored within the accessed exception register is needed to initiate the exception routine.

Figures 6A, 7A:
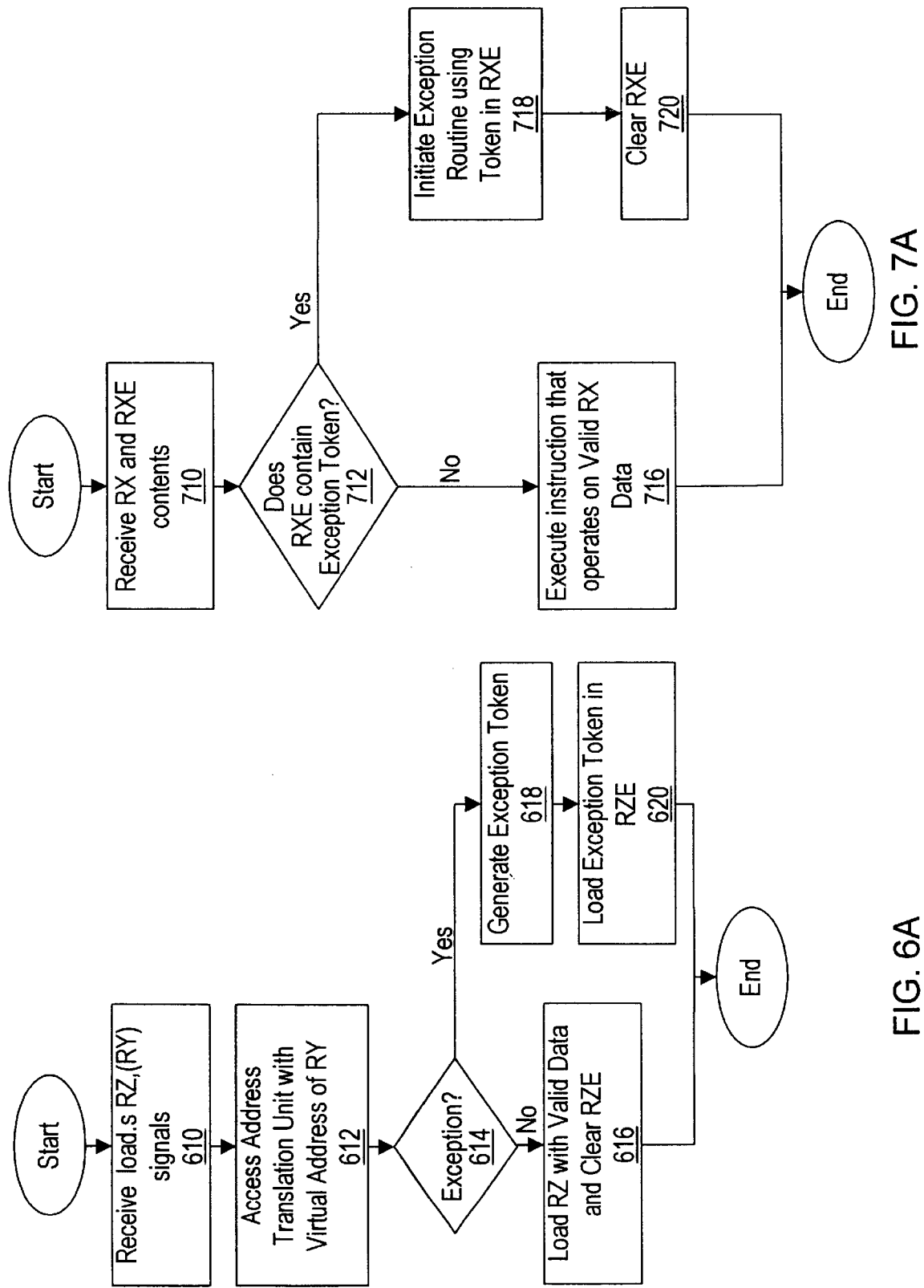
FIG. 6A is a flow chart illustrating operational aspects the memory access unit and write-back unit in accordance with one embodiment of the present invention.
FIG. 7A is a flow chart illustrating operational aspects of the execution unit operating in accordance with one embodiment of the present invention.

FIGS. 6A and 7A illustrate operational aspects of the processor core 202 shown in FIG. 2 including the memory access unit 308 shown in FIG. 3A and the register bank 312 shown in FIG. 4A. The present invention will be explained with respect to exceptions created during an address translation. However, the present should not be limited thereto. Rather, the present invention has broader application including use in cases where exception information is only relevant depending on a condition evaluated at a later point. One example is a divide operation in which a divide by zero is later checked. In this case exception information is stored within a register for later use if required. The present invention may also be applied in cases where exceptions are triggered by an external bus error during an actual bus transaction.

At step 610, the memory access unit of FIG. 3A receives signals corresponding to load.s-RZ,(RY), the signals including the virtual address (pointer) stored within one of the architectured registers (e.g. RY). In step 612, the address translation unit 410 shown in FIG. 3A is accessed with the received virtual address and an attempt is made to translate the virtual address into a physical address. At step 614 a determination is made as to whether the translation is successful. If no exception occurs, then the resulting translation (physical address) is used to access the memory system which, in turn, returns valid data to data register 416. The valid data is then is loaded into the architectured register RZ shown in FIG. 4A by write back unit 310, and RZE is cleared of any prior exception token as shown in step 616.

If, however, the attempted translation results in an exception, then exception token generator 412 of FIG. 3A generates the appropriate exception token which in turn is routed to and stored within the corresponding exception register RZE via write back unit 410 as shown in steps 618 and 620. Thus, even though an exception is detected as a result of executing the load.s RZ,(RY) instruction, the exception routine is not immediately initiated. Rather, the data necessary for the exception routine is stored within the exception register RXE for possible later use.

FIG. 7A is a flow chart describing operational aspects of the processor core 202 when initiating the exception routine using the register bank shown in FIG. 4A. At step 710, execution unit 306 receives control signals from decode unit 304 corresponding to an instruction for operating on data contained within an architectured register RX in addition to the contents of the architectured register RX and the contents of the corresponding exception register RXE from the register bank 312 shown in FIG. 4A. It is noted that RX may or may not correspond to RZ of FIG. 6A. Execution unit 306 may include a sub-unit which checks the data from the exception register RXE to determine whether it defines an exception token as shown at step 712. If the exception register RXE does not contain an exception token, than at step 716, execution unit 306 operates on the RX data in accordance with the instruction signals received from decode unit 304.

If, however, an exception token is contained in RXE, then at step 718, the exception handling or routine is initiated using the data stored within RXE. At step 720 RXE is cleared.

FIG. 3B is an alternative embodiment of the memory access unit 308 shown in FIG. 2. The memory access units in FIGS. 3A and 3B are similar in many aspects. However, one difference in the alternative embodiment is that the exception signal generated by the address translation unit 410 is concatenated with the output of the multiplexer 418 as shown. Thus, either an exception token or data fetched from the memory subsystem is concatenated to the exception signal generated by the address translation unit. The memory access unit 308 shown in FIG. 3B operates substantially similar to the memory access unit 308 described in FIG. 3A.

FIG. 4B shows an alternative embodiment of the register file 312 shown in FIG. 2. The register file 312 shown in FIG. 4B is substantially different than that shown in FIG. 4A. The register file shown in FIG. 4B contains only modified architectured registers R1–RN. These registers are the architectured registers shown in FIG. 4A modified to store an extra bit. For example, if the architectured registers of FIG. 4A are 32-bits wide, the modified architectured registers of FIG. 4B are 33-bits wide. FIG. 5B shows one embodiment of the modified architectured registers of FIG. 4B. As can be seen in FIG. 5B, the exception signal is stored in the extra bit of the modified architectured register while the remaining bits store either the exception token or valid data. It is noted that exception token may contain information which is wider than the remaining bits of the modified architectured registers. For example, instruction address, virtual address, and exception code may not fit inside the modified architectured register. In this case, part of the token could be stored externally to the modified register and subsequently retrieved when needed by the exception routine.

In operation, the information provided by the multiplexer 418 along with the concatenated exception bit shown in FIG. 3B, is stored into one of the modified architectured registers RX of FIG. 4B via write back unit 310 regardless of whether the information relates to valid data or an exception token. The contents of a modified architectured register shown in FIG. 4B is provided to the execution unit 308 in response to the execution unit 308 receiving an instruction for operating on data of the architectured register. However, the extra bit within each modified architectured register in FIG. 4B defines whether the contents of the modified architectured register is valid data or an exception token. As will be more fully described below, execution unit 306, upon receipt of the contents of a modified architectured register, either operates on valid data contained therein or triggers the initiation of an exception routine depending upon the extra bit contained therein.

FIGS. 6B and 7B show operational aspects of the processor core 202 shown in FIG. 2 using the memory access unit of FIG. 3B and the register file of FIG. 4B. At step 810 of FIG. 6B, memory access unit 308 receives signals corresponding with a speculative load instruction load.s RZ, (RY) including the virtual address contained within one of the architectured registers RY via execution unit 306. In response, the address translation unit 410 of FIG. 3B attempts to translate the received virtual address into a corresponding physical address as shown in step 812. At step 814, a determination is made as to whether the translation is successful or whether a memory access exception occurs. If a memory access exception occurs, then at step 816, an exception token is generated by the exception token generator 412. Thereafter in step 818, the exception signal generated by the address translation unit 410 is concatenated with the token. If, however, the translation does not create a memory access exception, then at step 820, the data subsequently retrieved from the memory system at the translated physical address is concatenated with the exception signal generated by the address translation unit 410. It is noted that if an exception occurs, the exception signal will be generated as a logical one, and the exception signal will be generated as a logical zero if no exception occurs. Either way, the modified architectured register corresponding to the load.s instruction is loaded with the results (i.e., the exception signal concatenated to either the exception token or valid data) of the memory access unit 308 via write back 310 as shown in step 822. Like the first embodiment described above with reference to register of FIG. 4A, if speculative load instruction load.s causes an exception, the exception routine is not immediately initiated. Rather, the necessary exception information is stored for possible later use by the exception routine.

FIG. 7B. is a flow chart describing operational aspects of processor core 202 when accessing the register bank of FIG. B. At step 924 in FIG. 7B, the execution unit 306 of FIG. 2 receives control signals from decoder 304 associated with an instruction for operating on RX data in addition to the contents of the architectured register RX, wherein the contents of RX includes the extra bit containing the exception signal. Execution unit 306 may include a logic sub-unit which checks the exception signal of the extra bit to determine whether the remaining contents of the architectured register RX contains valid data or an exception token as shown in step 926. If the exception signal is logical zero, the architectured register contains valid data, and execution unit 306 is instructed by the logic sub-unit to operate on the valid data contained therein as shown in step 928. If, on the other hand, the exception signal is set, then as shown in step 930, the architectured register RX contains an exception token or part thereof, and execution unit 306 triggers initiation of the exception routine using the stored exception token. Again it is noted that the modified register may not be wide enough to store the exception token. In this case, an external location most be accessed to obtain the parts or the exception token that could not fit in the modified register before initiating the exception routine. At step 932 the extra bit of the modified architectured register RX is cleared.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. In a microprocessor configured to execute instructions, a method of initiating an exception routine in response to a memory access exception caused by a speculative load instruction for loading one of a plurality of first registers with data from memory, the method comprising:

generating exception information in response to the memory access exception caused by the speculative load instruction;

storing the exception information within one of a plurality of second registers, wherein each of the second registers corresponds to at least one of the plurality of first registers;

receiving and decoding an instruction for operating on data stored in a first register;

checking the contents of a second register corresponding to the first register in response to receiving and decoding the instruction, and;

initiating the exception routine if the second register contains exception information, or executing the instruction to operate on data contained in the first register if the second register does not contain exception information.

2. The method of claim 1 wherein the plurality of first registers equals the plurality of second registers in number.

3. The method of claim 1 wherein the exception routine is initiated using the exception information stored in the second register.

4. The method of claim 1 wherein the exception information includes an instruction address of the speculative load instruction which caused the memory access exception.

5. The method of claim 4 wherein the exception information includes a memory address of the data to be loaded in one of the plurality of first registers.

6. The method of claim 5 wherein the exception information includes an exception code identifying a type of memory access exception.

7. In a microprocessor configured to execute instructions, a method of initiating an exception routine in response to a memory access exception caused by a first instruction for loading one of a plurality of architectured registers with data from memory, the method comprising:

generating exception information in response to the memory access exception caused by the first instruction;

storing the exception information within one of a plurality of exception registers, wherein each of said exception registers corresponds to at least one of the plurality of architectured registers;

receiving and decoding a second instruction for operating on data stored in the architectured register;

checking the contents of an exception register corresponding to the architectured register in response to receiving and decoding the second instruction; and initiating the exception routine if the exception register contains exception information, or executing the second instruction to operate on data contained in the architectured register if the exception register does not contain exception information.

8. The method of claim 7 wherein the first instruction is defined to be a speculative load instruction for loading one of a plurality of registers with data from memory.

9. The method of claim 8 wherein the data is stored in memory at an address identified by the speculative load instruction.

10. The method of claim 9 wherein the memory address is defined as a virtual address and wherein the exception is caused by an attempt to translate the virtual address into a physical address.

11. The method of claim 8 wherein the second instruction identifies a register as a source of an operand wherein the register corresponds to the exception register.

12. A microprocessor for executing instructions including speculative load instructions, which cause memory access exceptions, the microprocessor comprising:

a plurality of first registers for storing data received from memory in response to executing speculative load instructions;

a plurality of second registers for storing exception information to be used by an exception handling routine;

an exception information generator coupled to the plurality of second registers, wherein the exception information generator is configured to generate exception information in response to memory access exceptions caused by speculative load instructions;

an execution unit coupled to the plurality of first and second registers, wherein the execution unit is configured to execute instructions including instructions which operate on data stored in the plurality of first registers, wherein the execution unit is configured to receive data stored in a second register in response to receiving an instruction for operating on data contained in a first register, wherein the execution unit executes the instruction to operate on data contained in the first register if the received data is not exception information.

13. The microprocessor of claim 12 further comprising a decode unit coupled to the execution unit, wherein the decode unit is configured to receive and decode instructions, wherein the decode unit is further configured to fetch data stored in the plurality of second registers in response to receiving instructions which operate on data stored in the plurality of first registers, and wherein data fetched from the plurality of second registers is transmitted to the execution unit.

14. The microprocessor of claim 12 wherein the execution unit is configured to execute the exception routine using exception information stored in the second register.

15. The microprocessor of claim 12 wherein the plurality of first and second registers are equal in number.

16. The microprocessor of claim 12 wherein exception information includes an instruction address of a speculative load instruction.

17. The microprocessor of claim 16 wherein exception information includes a code identifying a type of memory access exception.

18. In a microprocessor configured to execute instructions, a method of initiating an exception routine in response to an exception caused by a first instruction for loading one of a plurality of first registers with data, the method comprising:

generating exception information in response to the exception caused by the first instruction;

storing the exception information within one of a plurality of second registers, wherein each of the second registers corresponds to at least one of the plurality of first registers;

receiving and decoding a second instruction for operating on data stored in a first register;

checking the contents of a second register corresponding to the first register in response to receiving and decoding the second instruction, and;

initiating the exception routine if the second register contains exception information, or executing the instruction to operate on data contained in the first register if the second register does not contain exception information.

19. The method of claim 18 wherein the first instruction is a speculative load instruction.

20. The method of claim 18 wherein the exception routine is initiated using the exception information stored in the second register.

21. A microprocessor for executing instructions including speculative load instructions which cause memory access exceptions, the microprocessor comprising:
- a plurality of first registers for storing data received from memory in response to executing speculative load instructions;
- a plurality of second registers for storing exception information to be used by an exception handling routine;
- an exception information generator coupled to the plurality of second registers, wherein the exception information generator is configured to generate exception information in response to memory access exceptions caused by speculative load instructions;
- an execution unit coupled to the plurality of first and second registers, wherein the execution unit is configured to execute instructions including instructions which operate on data stored in the plurality of first registers, wherein the execution unit is configured to receive data stored in a second register in response to receiving an instruction for operating on data contained in a first register, wherein the execution unit executes the instruction if the received data is not exception information;
- wherein the execution unit is configured to execute the exception routine using exception information stored in the second register;
- wherein the plurality of first and second registers are equal in number;
- wherein exception information includes an instruction address of a speculative load instruction.

* * * * *